United States Patent [19]

Shiota

[11] Patent Number: 5,331,303
[45] Date of Patent: Jul. 19, 1994

[54] POWER TRANSFORMER FOR CYCLOCONVERTERS

[75] Inventor: Hiromu Shiota, Mie, Japan

[73] Assignee: Kabushiki Kaisha Toshiba, Kawasaki, Japan

[21] Appl. No.: 871,823

[22] Filed: Apr. 21, 1992

[51] Int. Cl.$^5$ .............................................. H01F 33/00
[52] U.S. Cl. ...................... 336/12; 336/170; 336/5
[58] Field of Search ...................... 336/5, 10, 12, 170, 336/184; 363/9, 154, 160–162

[56] References Cited

U.S. PATENT DOCUMENTS

| | | | |
|---|---|---|---|
| 2,374,029 | 4/1945 | Maslin | 336/12 |
| 4,513,243 | 4/1985 | Novak et al. | 336/12 X |
| 4,694,241 | 9/1987 | Genuit | 336/10 X |
| 4,853,664 | 8/1989 | Asakura | 336/160 X |
| 5,063,487 | 11/1991 | Johnson et al. | 336/154 X |

FOREIGN PATENT DOCUMENTS

| | | | |
|---|---|---|---|
| 63-157675 | 6/1988 | Japan | H02M 5/27 |
| 480908 | 3/1992 | Japan | 336/170 |
| 197711 | 11/1977 | U.S.S.R. | 336/160 |

OTHER PUBLICATIONS

B. R. Pelly, "Cycloconverter," Nov. 20, 1976, pp. 130–131, Denki Shoin, Tokyo publisher.

Primary Examiner—L. Thomas
Attorney, Agent, or Firm—Limbach & Limbach

[57] ABSTRACT

A power transformer for cycloconverters comprises an iron core having three legs, nine positive group windings, nine negative group windings, and nine power supply windings. Three of the positive group windings, three of the negative group windings and three of the power supply windings are wound on each leg of the iron core. In application to the cycloconverters, three positive and negative group windings are allotted to each of three converters of the cycloconverter so that the three-phase AC voltages are applied to the three converters respectively. The three power supply windings are allotted to each pair of positive and negative group windings so that a winding circuit impedance becomes equal between the positive and negative group windings. These windings are arranged into a single transformer in which the windings are magnetically connected together by one three-leg core.

2 Claims, 8 Drawing Sheets

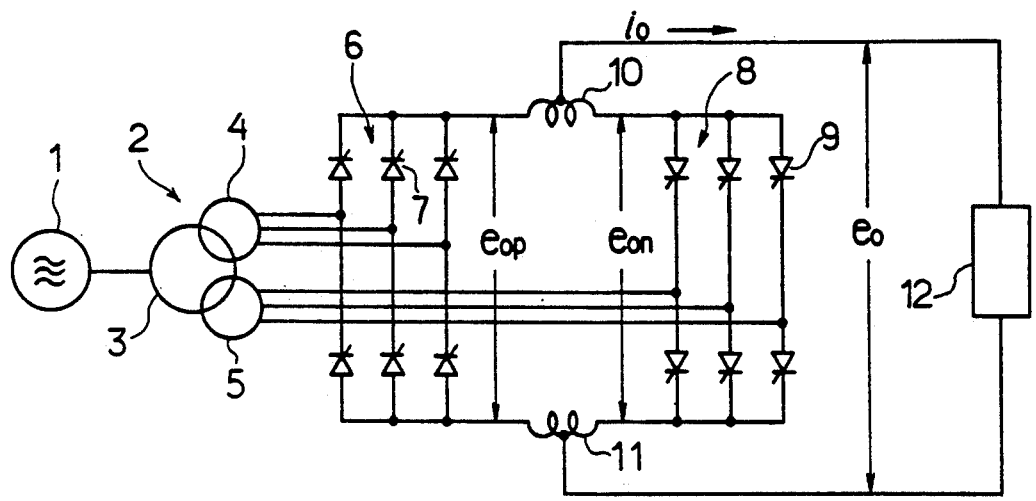
FIG. 7 (PRIOR ART)
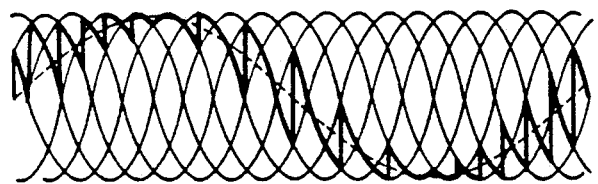
FIG. 8(a) $e_{op}$
(PRIOR ART)
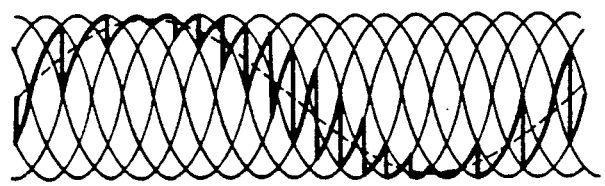
FIG. 8(b) $e_{on}$
(PRIOR ART)
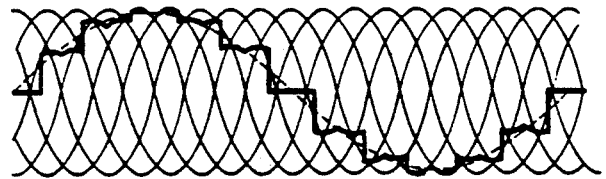
FIG. 8(c) $e_o$
(PRIOR ART)

POWER TRANSFORMER FOR CYCLOCONVERTERS

BACKGROUND OF THE INVENTION

This invention relates to a transformer suitable for using as a power transformer for cycloconverters, and more particularly to such a transformer having a three-phase connected winding arrangement.

Japanese Laid-open Patent Application (Kokai) NO. 63-86563 (1988) discloses a circulating current type cycloconverter in which the transformer of the type described above is employed. The conventional cycloconverter will be described with reference to FIGS. 7 through 9 of the accompanying drawings. Reference numeral 1 designates a three-phase AC power source. A three-phase transformer 2 comprises power supply windings 3 (primary winding), positive group windings 4 (secondary winding) and negative group windings 5 (secondary winding). A positive group converter 6 comprises six thyristors.7 three-phase bridge connected. A negative group converter 8 also comprises six thyristors 9 three-phase bridge connected. Circulating current limiting reactors 10 and 11 are connected between positive and negative DC output terminals of the converters 6, 8 respectively. A load 12 is connected between neutral points of the reactors 10, 11. When a gate signal having a predetermined pattern is supplied to a gate of each thyristor 7, 9 of each converter 6, 8, voltages $e_{op}$, $e_{on}$ and $e_o$ having waveforms shown by bold solid lines in FIG. 8 are obtained between output terminals of the positive group converter 6, between output terminals of the negative group converter 8, and between terminals of the load 12 respectively. In this case the voltage $e_o$ is a mean value of the voltages $e_{op}$, $e_{on}$. In FIG. 8, thin solid lines denote output voltage waveforms of the three-phase AC power source 1 and dotted lines denote fundamental wave components of the respective voltages $e_{op}$, $e_{on}$ and $e_o$. The cycloconverter is thus employed as a frequency changing circuit for directly changing a power source frequency into an optional frequency in a range lower than the power source frequency by controlling the gate signals supplied to the gates of the thyristors.

In the above-described cycloconverter, a positive half-wave current $i_{op}$ of a load current $i_o$ is supplied from the thyristors 7 of the positive group converter 6 and a negative half-wave current $i_{on}$ of the load current $i_o$ is supplied from the thyristors 9 of the negative group converter 8, as is shown in FIG. 9. In the case of the positive half-wave current $i_{op}$, for example, the converter 6 performs a forward converting function in a period that the thyristors 7 are forward biased, such as in the period between t2 and t3, since the current is also forward biased. Furthermore, the converter 6 performs a reverse converting function in a period that the current flows in the forward direction, such as in the period between t3 and t4, after the thyristors 7 has transferred to a reverse biased state. The other converter 8 is on standby to thereby block the current flowing therethrough in the periods that the converter 6 performs the forward and reverse converting functions. Although such a standby mode is provided each half-cycle, a circulating current actually flows into both of the converters 6, 8 through the respective reactors 10, 11 since the voltages contain harmonics, as shown in FIG. 8. Only the half-wave current flows into the positive and negative group windings 4, 5 of the transformer 2 while a full-wave current flows into the power supply windings 3 so that the positive and negative group windings 4, 5 have one and the same ampere-turn. Accordingly, a current carrying capacity of the power supply windings 3 is approximately 2 where the current carrying capacity of the positive or negative group windings 4 or 5 is 1. The cycloconverter as shown in FIG. 7 is generally referred to as that of the six pulse bridge type.

In a three-phase transformer employed in the above-described cycloconverter as the power transformer, each core leg is provided with concentrically disposed one positive group winding 4, one negative group winding 5 and one power supply winding 3 interposed between the positive and negative group windings, in each phase of the three-phase windings. Accordingly, six converters and three three-phase transformers are required when a three-phase load is connected to the cycloconverter. The increase in the number of three-phase transformers to three results in increases in the production cost and the installation space of the cycloconverter. Furthermore, a no-load loss or in particular, an iron loss increases as the volume of the core is increased. The increase in the no-load loss is contrary to the employment of the cycloconverter for the variable speed control of the induction motor for the purpose of saving the consumption of the electrical energy.

SUMMARY OF THE INVENTION

Therefore, an object of the present invention is to provide a transformer which can be employed as a power transformer connected to the cycloconverter supplying a three-phase AC power to a three-phase load and which can be composed of a single core, resulting in the reductions of the no-load loss, the size and weight, the production cost and the mounting space of the transformer.

The present invention provides a transformer comprising an iron core having three legs, nine positive group windings, nine negative group windings, and nine power supply windings, each leg of the iron core being provided with the three positive group windings, the three negative group windings, and the three power supply windings.

In order that the transformer of the present invention is employed as the power transformer supplying the three-phase load with the three-phase AC power, three positive and negative group windings are allotted to each of three converters of the cycloconverter so that the three-phase AC voltages are applied to the three converters respectively. The three power supply windings are allotted to each pair of positive and negative group windings so that a winding circuit impedance becomes equal between the positive and negative group windings. These windings are arranged into a single transformer in which the windings are magnetically connected together by one three-leg core. Only one core is necessary in the transformer arranged as described above although it performs functions of three, three-phase transformers. Consequently, only two yokes are required in the present invention although six core yokes are required in the case of three three-leg cores each having two core yokes, resulting in the reduction in the volume of the core.

Other objects of the present invention will become obvious upon understanding of the illustrative embodiments about to be described. Various advantages not referred to herein will occur to one skilled in the art upon employment of the invention in practice.

BRIEF DESCRIPTION OF THE DRAWINGS

Two embodiments will be described with reference to the accompanying drawings in which:

FIG. 7 is an electrical connection diagram of a conventional cycloconverter for a single-phase load;

FIGS. 8(a), 8(b) and 8(c) are voltage waveform charts at respective portions of the cycloconverter shown in FIG. 7;

DESCRIPTION OF THE PREFERRED EMBODIMENTS

Figure 1:
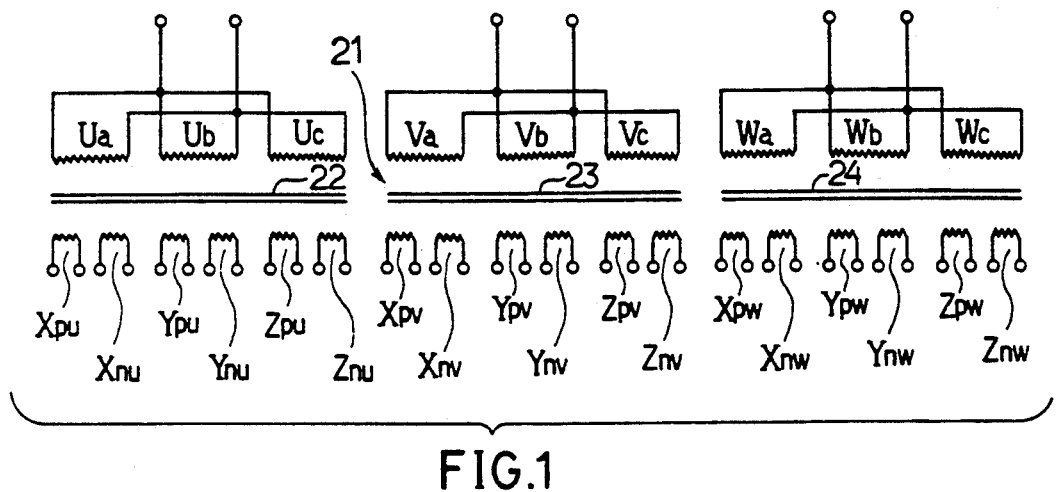
FIG. 1 is a view schematically illustrating relations among windings and relations between core legs and the windings in a transformer of a first embodiment in accordance with the present invention.

A first embodiment wherein the present invention is applied to a power transformer for a six pulse bridge type cycloconverter will be described with reference to FIGS. 1 through 4. The power transformer 20 comprises a three leg type core 21 having three legs 22, 23 and 24 and two yokes 5 magnetically connecting upper and lower portions of the legs 22–24 together respectively. FIG. 2 illustrates a winding arrangement with respect to the core leg 22. Three positive group windings $X_{pu}$, $Y_{pu}$ and $Z_{pu}$ belonging to a phase U are wound on the core leg 22 as an innermost layer so as to axially aligned. In the same manner, three power supply windings $U_a$, $U_b$ and $U_c$ belonging to the phase U are wound on the respective outer peripheries of the positive group windings $X_{pu}$, $Y_{pu}$, $Z_{pu}$ so as to axially aligned concentrically with the respective positive group windings. Three negative group windings $X_{nu}$, $Y_{nu}$ and $Z_{nu}$ belonging to the phase U are wound on the respective outer peripheries of the power supply windings $U_a$, $U_b$, $U_c$ as an outermost layer so as to be axially aligned concentrically with the respective positive group and power supply windings. The same winding arrangement as described above is applied to each of the core legs 23, 24.

Figure 2:
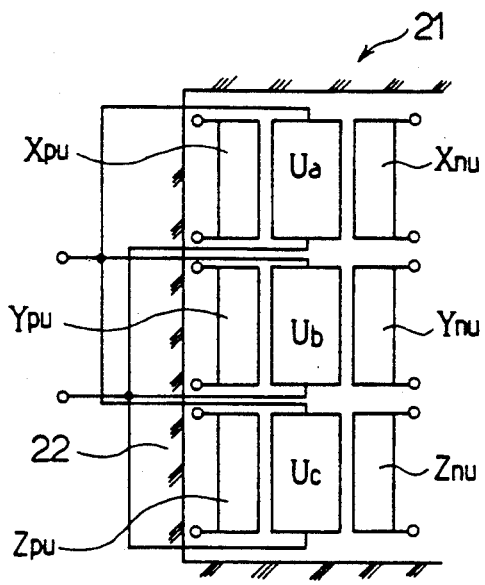
FIG. 2 is a diagrammatic longitudinally sectional view of one leg of the core of the transformer, illustrating an arrangement of the windings in the one leg.

FIG. 1 illustrates the relations between the core legs 22–24 and the windings arranged as described above.

Three positive group windings $X_{pv}$, $Y_{pv}$ and $Z_{pv}$ belonging to a phase V and three positive group windings $X_{pw}$, $Y_{pw}$ and $Z_{pw}$ belonging to a phase W are wound on the core legs 23, 24 respectively. Three negative group windings $X_{nv}$, $Y_{nv}$ and $Z_{nv}$ belonging to the phase V and three negative group windings $X_{nw}$, $Y_{nw}$ and $Z_{nw}$ belonging to the phase W are also wound on the core legs 23, 24 respectively. Furthermore, three power supply windings $V_a$, $V_b$ and $V_c$ belonging to the phase V and three power supply windings $W_a$, $W_b$ and $W_c$ belonging to the phase W are wound on the core legs 23, 24 respectively.

Figure 3:
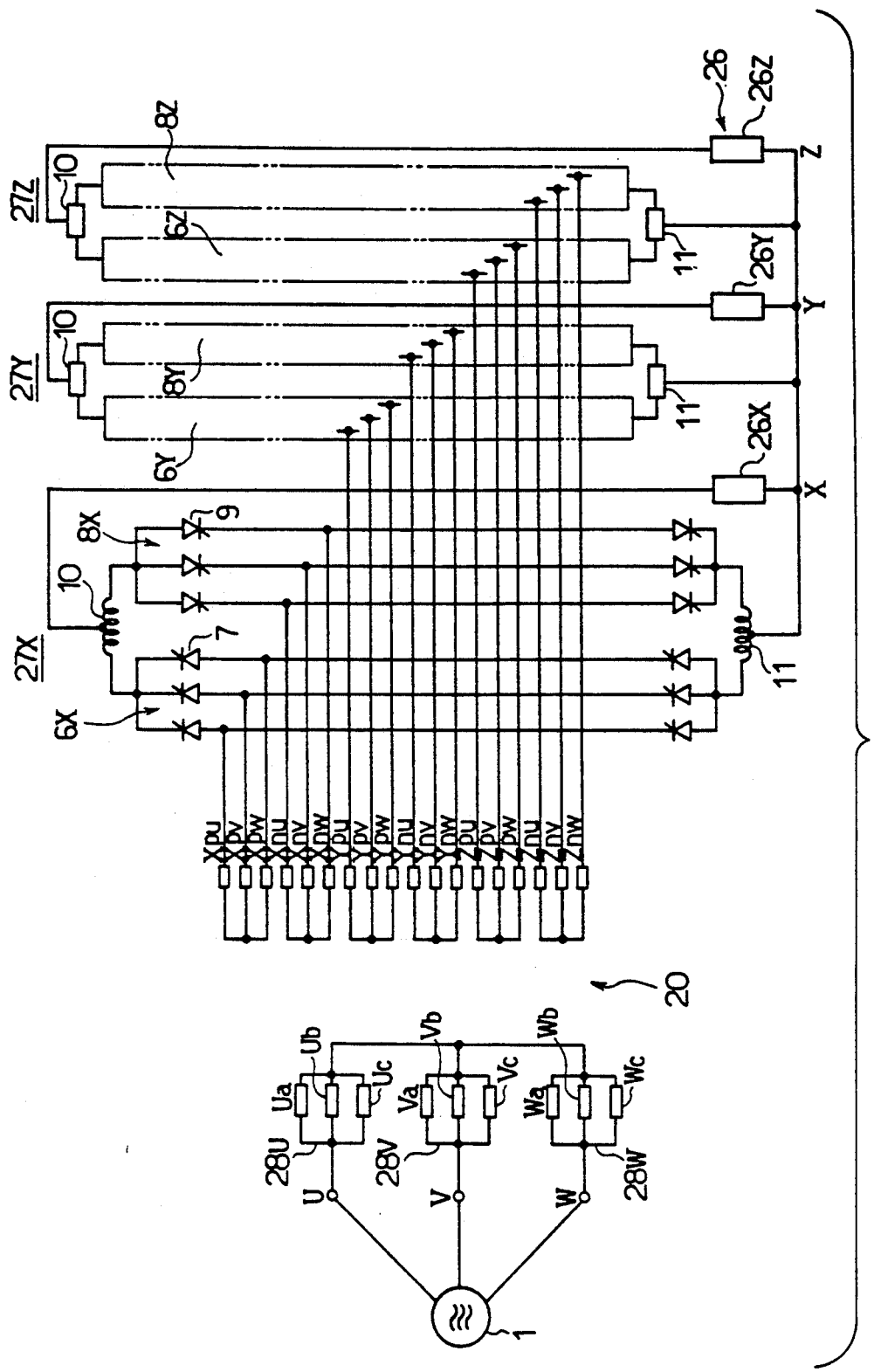
FIG. 3 is an electrical connection diagram of three cycloconverters of the six pulse bridge type, for which cycloconverters the transformer of the first embodiment is employed.

FIG. 3 illustrates three-phase cycloconverters of the six pulse bridge type employing the above-described power transformer 20 as their power supply. A three-phase induction motor 26 serving as a three-phase load comprises stator windings 26X, 26Y and 26Z corresponding respectively to, for example, three-phase star-connected windings X, Y and Z. The stator windings of the motor 26 are connected so that AC voltages are applied to the stator windings 26X–26Z from the three cycloconverters 27X, 27Y and 27Z respectively. Each of the cycloconverters 27X–27Z has the same electrical arrangement as those of the positive and negative group cycloconverters 6, 8 shown in FIG. 7. More specifically, positive group converters 6X, 6Y and 6Z are connected so as to correspond to the stator windings 26X, 26Y, 26Z further corresponding to the three phases X, Y, Z at the motor 26 side, respectively. Negative group converters 8X, 8Y and 8Z are connected so as to correspond to the stator windings 26X, 26Y, 26Z respectively. A connection between each converter and the windings of the transformer 20 is as follows. First, the three, phase U power supply windings $U_a$, $U_b$, $U_c$ wound on the core leg 22 are connected in parallel to form a parallel winding circuit 28U, which circuit is further connected to the phase U of the three-phase AC power source 1. The three, phase V power supply windings $V_a$, $V_b$, $V_c$ wound on the leg 23 are connected in parallel to form a parallel winding circuit 28V, which circuit is further connected to the phase V of the AC power source 1. The three, phase W power supply windings $W_a$, $W_b$, $W_c$ are connected in parallel to form a parallel winding circuit 28W, which circuit is further connected to the phase W of the three-phase AC power source 1. Then, the three parallel winding circuits 28U, 28V, 28W are three-phase connected in star, for example. On the other hand, the three positive group windings $X_{pu}$, $X_{pv}$, $X_{pw}$ wound dispersively on the three core legs 22–24 to correspond to the phases U, V, W respectively are connected in star to form a three-phase winding circuit, which circuit is then connected to the positive group converter 6X corresponding to the phase X. In the same manner, the three negative group windings $X_{nu}$, $X_{nv}$, $X_{nw}$ wound dispersively on the three core legs 22–24 to correspond to the phases U, V, W respectively are also connected in star to form a three-phase winding circuit, which circuit is connected to the negative group converter 8X. Furthermore, the positive group windings $Y_{pu}$, $Y_{pv}$, $Y_{pw}$ wound dispersively on the three core legs 22–24 respectively to correspond to the phase Y are connected in star to form a three-phase winding circuit, which circuit is connected to the positive group converter 6Y corresponding to the phase Y. In the same manner, the negative group windings $Y_{nu}$, $Y_{nv}$, $Y_{nw}$ wound dispersively on the three core legs 22–24 respectively to correspond to the phase Y are also connected in star to form a three-phase winding circuit, which circuit is connected to the negative group converter 8Y. Additionally, the positive group windings $Z_{pu}$, $Z_{pv}$, $Z_{pw}$ wound dispersively on the three core legs 22-24 respectively to correspond to the phase Z are connected in star to form a three-phase winding circuit, which circuit is connected to the positive group converter 6Z corresponding to the phase Z. In the same manner, the negative group windings $Z_{nu}$, $Z_{nv}$, $Z_{nw}$ wound dispersively on the three core legs 22-24 respectively to correspond to the phase Z are connected in star to form a three-phase winding circuit, which circuit is connected to the negative group converter 8Z corresponding to the phase Z.

As the result of the above-described connection, the three-phase AC voltages are applied to the stator windings 26X, 26Y, 26Z of the induction motor 26 from the cycloconverters, respectively. The frequencies of the respective three-phase AC voltages are varied by controlling gate signals to the thyristors 7, 9 composing each converter.

Figure 4:
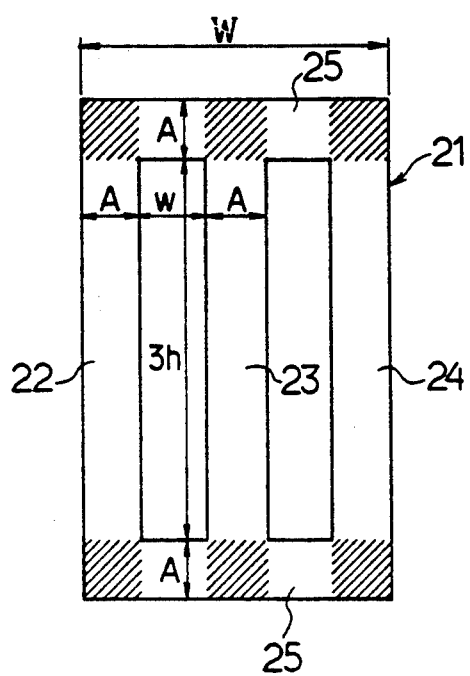
FIG. 4 is a front view of the core of the transformer of the first embodiment.
Figure 10:
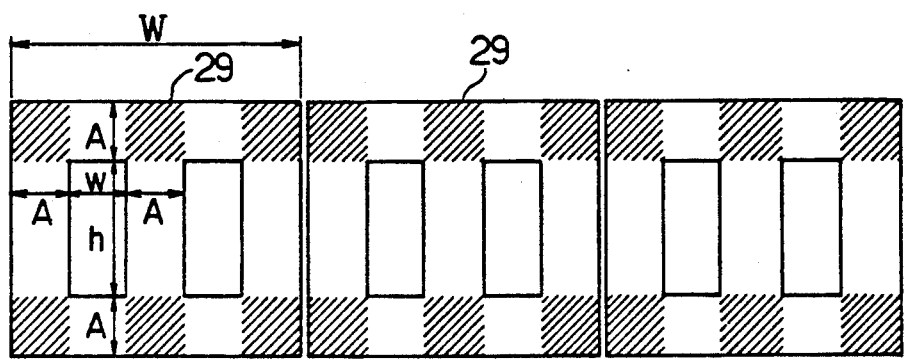
FIG. 10 is a front view of the core of the conventional transformer, which is compared with the first embodiment of the invention.

Only a single core 21 is required in the transformer 20 employed for the cycloconverters for applying the three-phase AC voltages to the three-phase load while, in the prior art, three transformers or three independent cores 29 are necessary for the same purpose, as shown in FIG. 10. Referring to FIGS. 4 and 10, the core volume is compared between the prior art and the above-described embodiment by using the dimensions shown in the figures. In this regard the thickness of the core is represented as 1 for convenience sake. The total volume V of the three cores in the prior art is shown by the following equation:

$$V=3\{W(2A+h)-2wh\}=6WA+3Wh-6wh.$$

On the other hand, the volume V' of the core 21 in the embodiment is shown by the following equation:

$$V'=W(2A+3h)-6wh=2WA+3Wh-6wh.$$

As is obvious from the difference between V and V' the volume of the core 21 in the embodiment is smaller by 4WA than that in the prior art. More specifically, a single three leg type core has two yokes. The prior art arrangement includes six yokes while, in the present invention, only two yokes are necessary, resulting in reduction in the core volume. When two cores are formed of the same material and have the same flux density, the no-load loss in each core is proportional to each core volume. Consequently, the no-load loss corresponding to 4WA is reduced in the embodiment as compared with the prior art. Furthermore, much of the no-load loss is induced in the portions of the core yokes shown by oblique lines in FIGS. 4 and 10. However, since the number of the yokes is reduced in the embodiment as compared with the prior art, the no-load loss is further reduced. Additionally, the cost of the material for the transformer can be reduced with the reduction in the core volume, and the production cost can be reduced since the number of steps of the assembly of the cores is reduced to about one third of that in the prior art. The mounting space of the core is also reduced to about one third of that in the prior art.

In the foregoing embodiment, the connection between the windings and the converters is made so that all the windings wound on the same core leg correspond to one of the three phases. However, the manner of connecting between the windings and the converters is not limited to the above-described since the three core legs are magnetically coupled to one another.

Figure 5:
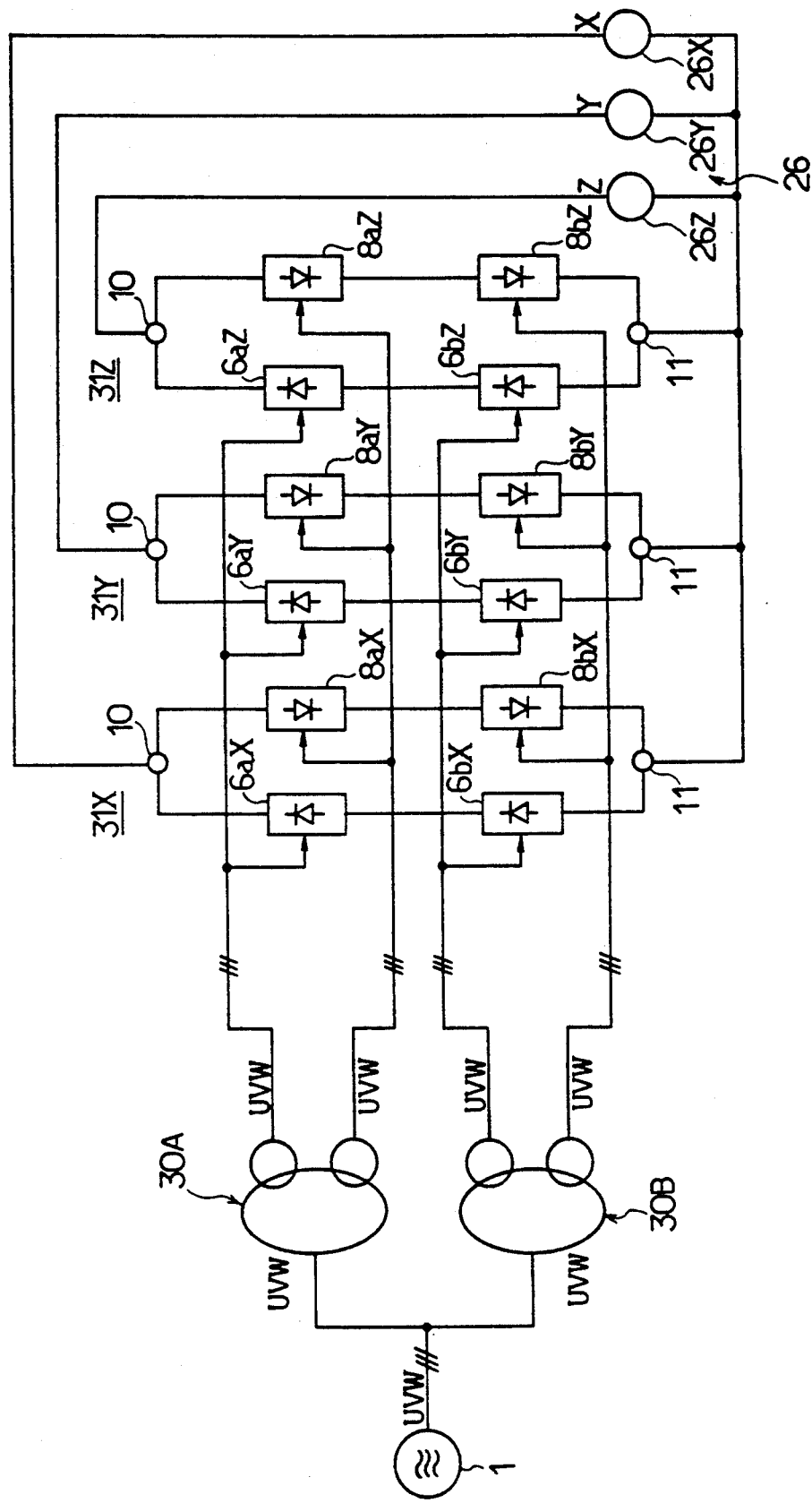
FIG. 5 is an electrical connection diagram of three cycloconverters of the twelve pulse bridge type, for which converters the transformer of a second embodiment of the invention is employed.
Figure 6:
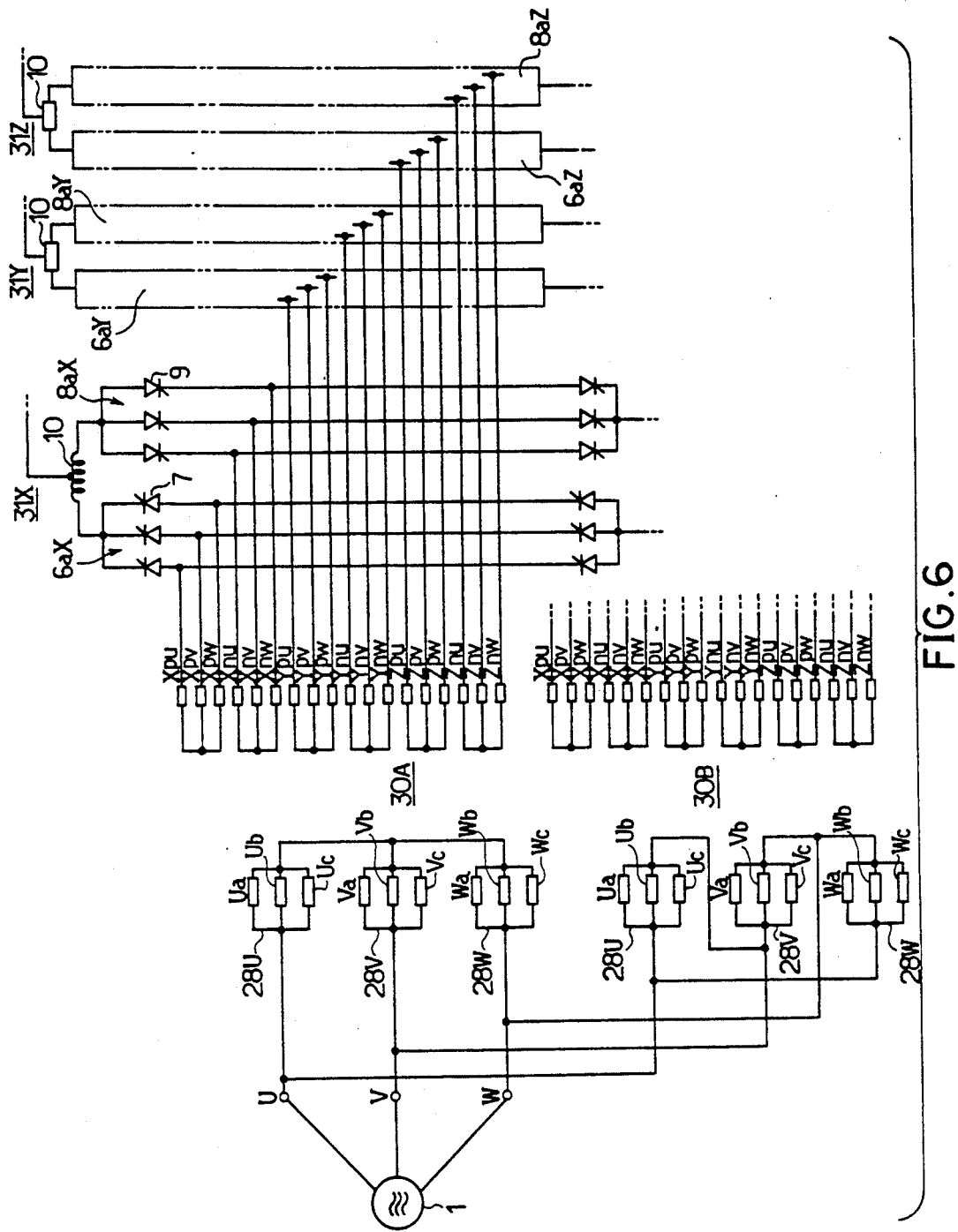
FIG. 6 is an electrical connection diagram of a part of the cycloconverters shown in FIG. 5.
Figure 9:
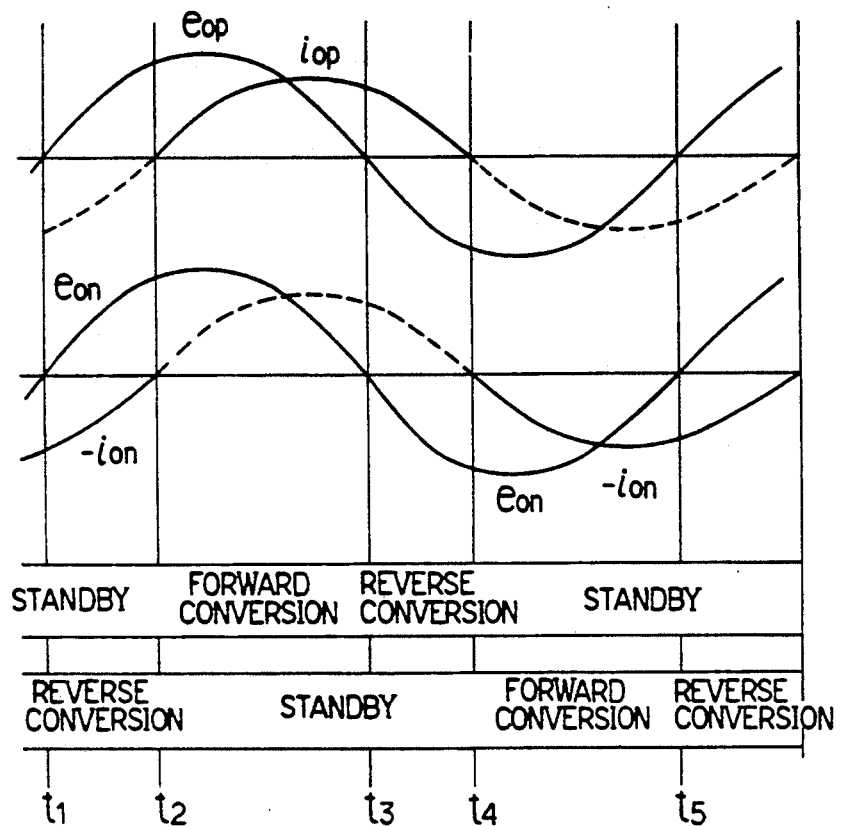
FIG. 9 is a time chart showing voltage and current waveforms at the respective portions of the cycloconverter in FIG. 7.

FIGS. 5 and 6 illustrate a second embodiment wherein the invention is applied to the cycloconverters of the twelve pulse bridge type. In FIGS. 5, 6, the identical parts are designated by the same reference numerals as in FIGS. 1 and 3. Each of the first and second transformers 30A and 30B employed the cycloconverters in the second embodiment has the same electrical arrangement as the transformer 20 in the first embodiment. FIG. 5 illustrates an overall electrical arrangement of the cycloconverters incorporating the first and second transformers 30A, 30B as the power supply. FIG. 6 illustrates a wiring arrangement of the cycloconverters. Referring to FIG. 5, the AC voltages are applied to the respective stator windings 26X, 26Y and 26Z of the three-phase induction motor 26 from the three cycloconverters 31X, 31Y and 31Z of the twelve pulse bridge type, which cycloconverters correspond to the respective phases. The cycloconverter 31X comprises first and second positive group converters 6aX and 6bX and first and second negative group converters 8aX and 8bX. Each of these converters is three-phase bridge connected in the same manner as in the converters 6X, 8X shown in FIG. 3. In the same manner, the cycloconverter 31Y comprises first and second positive group converters 6aY and 6bY and first and second negative group converters 8aY and 8bY. The cycloconverter 31Z comprises first and second positive group converters 6aZ and 6bZ and first and second negative group converters 8aZ and 8bZ. Three parallel winding circuits 28U, 28V and 28W formed by nine power supply windings Ua through Wc of the first transformer 30A are connected in star, while three parallel winding circuits formed by nine power supply windings Ua through Wc of the second transformer 30b are connected in a different three-phase connection manner or in delta. This difference in the connection manner results in the phase difference of 30 degrees between the winding output voltages of the first and second transformers 30A, 30B.

As the result of the above-described connection, the phase difference of 30 degrees is caused between the AC voltages applied to the first positive and negative group converters 6aX-8aZ of the cycloconverters 31X, 31Y, 31Z and the AC voltages applied to second positive and negative group converters 6bX-8bZ of the cycloconverters, respectively. The above-described phase difference thus enlarges the range of frequency varied by controlling the gate signals to the thyristors 7, 9 composing each converter as compared with the case of the first embodiment.

Figure 11:
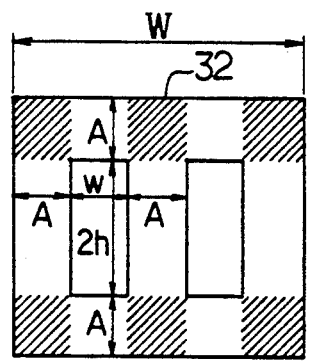
FIG. 11 is a front view of the core of another conventional transformer, which is compared with the second embodiment of the invention.

In accordance with the second embodiment, only the two transformers 30A, 30B or the two cores 21 are required for the cycloconverters for applying the three-phase AC voltages to the three-phase load while three transformers or three independent cores 32 are required in the prior art as shown in FIG. 11. Referring to FIGS. 4 and 11, the core volume is compared between the prior art and the above-described second embodiment by using the dimensions shown in the figures. In this regard the thickness of the core is represented as 1 for convenience sake. The total volume V of the three cores in the prior art is shown by the following equation:

$$V=3\{W(2A+2h)-4wh\}=6WA+6Wh-12wh$$

On the other hand, the total volume V' of the two cores 21 in the embodiment is shown by the following equation:

$$V' = 2W(2A + 3h) - 12wh = 4WA + 6Wh - 12wh. \quad (5)$$

As is obvious from the difference between V and V' the volume of the core 21 in the embodiment is smaller by 2WA than that in the prior art.

The three-phase connection manner of the power supply windings differ between the first and second transformers in order to achieve the phase difference of 30 degrees therebetween in the second embodiment. Alternatively, the power supply windings may be three-phase connected in the same manner in both transformers and the manner of connecting the positive and negative group windings may differ between the first and second transformers. For example, the positive and negative group windings in the first transformer may be connected in star while the positive and negative group windings in the second transformer may be connected in delta.

Three transformers each having the same core and the same winding arrangement as those in the transformer in the second embodiment may be provided for forming the cycloconverters of eighteen pulse bridge type. In this case the power supply windings are connected in zigzag so that the phase difference of 20 degrees can be obtained. Furthermore, the present invention may be applied to the cycloconverters of the twenty-four plus bridge type.

Although the power supply windings are concentrically interposed between the positive and negative windings respectively radially of the core legs in the first and second embodiments, the power supply windings may be interposed between the positive and negative group windings coaxially of the respective core legs.

The foregoing disclosure and drawings are merely illustrative of the principles of the present invention and are not to be interpreted in a limiting sense. The only limitation is to be determined from the scope of the appended claims.

I claim:

1. A transformer comprising first and second iron cores each having three legs, nine positive group windings, nine negative group windings, and nine power supply windings,
    wherein three of the positive group windings, three of the negative group windings and three of the power supply windings are wound on each leg of each of the first and second iron core,
    wherein three parallel winding circuits each formed by connecting the three power supply windings belonging to one and the same phase in one and the same iron core in parallel with one another are connected into a three-phase circuit,
    wherein three three-phase winding circuits are formed each by connecting, into a three-phase circuit, the three positive group windings belonging to one and the same phase provided in each leg of one and the same iron core,
    wherein three three-phase winding circuits are formed each by connecting, into a three-phase circuit, the three negative group windings belonging to one and the same phase provided in each leg of one and the same iron core, and
    wherein manners of the three-phase connection of the power supply windings differ from one another so that a phase difference is induced between the power supply windings of the first iron core and the power supply windings of the second iron core.

2. A transformer comprising first and second iron cores each having three legs, nine positive group windings, nine negative group windings, and nine power supply windings,
    wherein three of the positive group windings, three of the negative group windings and three of the power supply windings are wound on each leg of each of the first and second iron core,
    wherein three parallel winding circuits each formed by connecting the three power supply windings belonging to one and the same phase in one and the same iron core in parallel with one another are connected into a three-phase circuit,
    wherein three three-phase winding circuits are formed each by connecting, into a three-phase circuit, the three positive group windings belonging to one and the same phase provided in each leg of one and the same iron core,
    wherein three three-phase winding circuits are formed each by connecting, into a three-phase circuit, the three negative group windings belonging to one and the same phase provided in each leg of one and the same iron core, and
    wherein manners of the three-phase connection of the positive and negative windings differ from each other so that a phase difference is induced between the positive and negative group windings of the first iron core and the positive and negative windings of the second iron core.

* * * * *